March 23, 1954
J. B. BRENNAN
2,673,230
BATTERY SEPARATOR
Original Filed Jan. 8, 1949
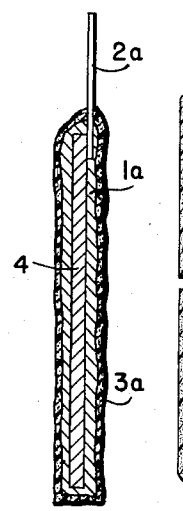
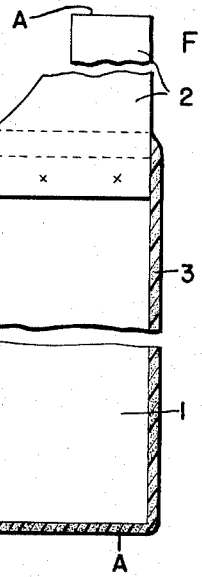
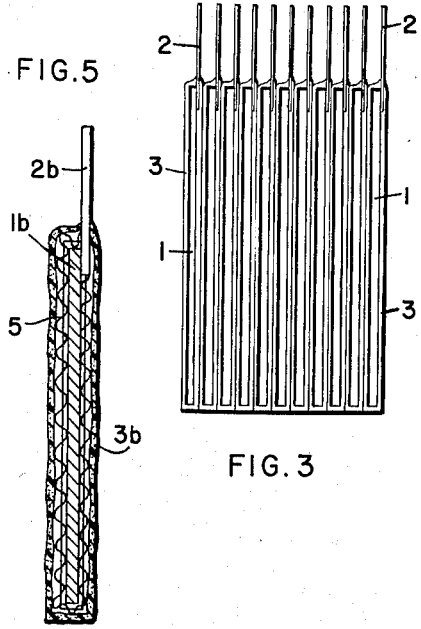
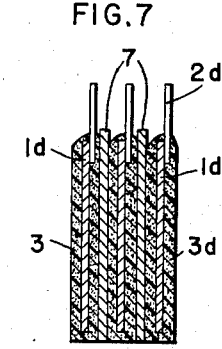
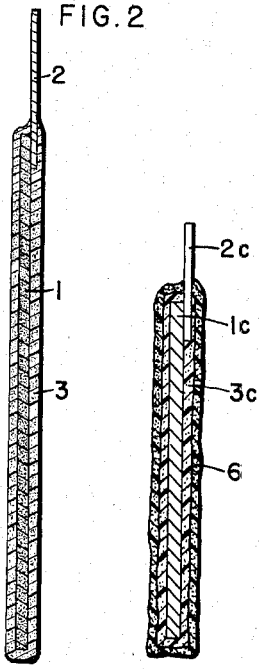
INVENTOR.
Joseph B. Brennan
BY West & Oldham
Attorneys Patented Mar. 23, 1954

2,673,230

UNITED STATES PATENT OFFICE 2,673,230

BATTERY SEPARATOR

Joseph B. Brennan, Cleveland, Ohio

Original application January 8, 1949, Serial No. 69,863. Divided and this application April 30, 1949, Serial No. 90,609

4 Claims. (Cl. 136—147)

This invention relates to storage battery electrodes and electrolytic cell electrodes and especially to porous dielectric separators or spacers for such electrodes.

This invention is a division of my co-pending application Serial No. 69,863, filed January 8, 1949, insofar as it contains common subject matter.

According to this invention I directly apply the porous dielectric spacer described in the above application to either one or more or all sides of an electrode after its having been impregnated with active material or pasted or coated therewith.

When the porous electrode containing active material therein and thereon as for a storage battery is coated with dielectric particles as by spray depositing one or more layers thereover while being held at a temperature to cause a porous deposit of molten particulate material as of polythene or polystyrene thereover a porous pocket or envelope is produced thereby which contains the electrode and active material therein for each or alternate plates of the storage battery assembly so that shedding of the active material is eliminated while permitting free passing of ions and free gassing of the electrolytic cell and electrodes therein.

The porous pocket or envelope for each electrode can be made by spray depositing the strip electrode material with particulate molten or tacky particles of dielectric material so that a porous envelope is produced about the porous electrode and the active material with which the porous metal part of the electrode has been coated and/or impregnated or filled and coated by electroformation of the active material therein or thereon or by a combination of these processes.

In any case according to this invention a porous electrode in its porous envelope of dielectric material containing active material in contact with its porous metal portion is produced.

Electroformation, or impregnation of the porous electrode can be effected after the exterior porous dielectric coating of this invention is applied so that in this case the active material is formed and adherently deposited on and in the interstices of the porous metal portion of the electrode within its porous envelope.

Also the porous dielectric coating can be spray deposited after electroformation, impregnation or pasting of the porous metal electrode.

Another way in which the porous particulate layer may be applied to the electrode according to this invention is to sift or spray the particles through a fog or spray of solvent therefor so as to wet same with said solvent spray thereby rendering the exterior of said particles tacky and simultaneously depositing the so-wetted dielectric particles in a layer over the outside of the porous metallic electrode and thereafter bake the so-coated electrode under the flow temperature of the dielectric particles.

Another way in which the objects of this invention may be carried out is to place the porous electrode in a smooth polished pocket and then fill up said pocket with loose particles of dielectric material and then spray or dip the layer in a solvent as toluol and remove quickly and dry and bake whereby the particles will stick to each other to form an adherent tough coating and yet remain porous.

Another way in which the particulate coating may be made according to this invention is to coat one side of an electrode with a layer of dry particles with a doctor blade to level off the layer to a uniform height having the particles extend over and outside the edges of said electrode then spray same with a fog spray gun with a solvent such as toluol then bake same and turn over and coat the opposite side of the said electrode in a similar manner and then bake whereupon the entire electrode except a portion of its terminal will be enclosed in and surrounded by an adherent porous particulate layer whereby the thickness thereof will be uniform.

Another way is to deposit particles all over the exterior of the electrodes with solvent wetted dielectric particulate plastic so that the edges and faces are uniformly coated and then bake same at a temperature just sufficient to harden the particles but under the flow temperature thereof.

Strips of aggregated plastic particles may be built up in layer form and wetted with a solvent to render the exterior of the particles plastic and pieces of such strips may be formed by light pressure in a mold and baked to produce a cup-like or hollow shape two of which may be applied to each side of an electrode to enclose same.

The strips so produced may be shaped by other means to conform to the exterior of the electrodes and to form an enclosure therefor.

In case a series of electrodes are to be assembled in facial juxtaposition as is usual in an electrolytic cell only one side and the edges of each electrode need be coated and the coated sides may be joined as by cement at their edges and the single side coated electrodes stacked so that a unitary enclosure for the stack results.

It is also preferable in some cases to coat the assembled stack with additional porous particulate aggregates or layers so that the stack of plates and separators can be made to fit exactly or in spaced relation into the container for the stack so that the porous exterior enclosure for the electrodes serves also to position the assembly in the container and retain it in position as well as to retain the electrolyte therearound and to permit free circulation therearound and therein.

In other words the voids in the container having the stack therein may be filled with dielectric particles and then baked to fuse the particles into a porous unit.

When the material of the porous electrode enclosure is suitable as for instance polystyrene particles these can be wetted on the outside with solvent and if the container is of like material they can be fitted together so that the porous plate enclosure is cemented to the impervious container and subsequent movement in use is prevented.

The electrodes for use with my present invention are preferably of porous metal particles in thin flexible strip form of .010" to .050" thick.

Porous spray deposited zinc can be used effectively as a negative electrode in a sodium zincate or potassium zincate electrolyte with a positive porous spray deposited nickel plate for a storage battery.

Porous nickel may be used for each electrode if coated or impregnated with suitable active material.

I have found that a spray deposited electrode of nickel having a molten spray deposited coating of porous cadmium thereover and then pasted with cadmium oxide or electroformed therewith works satisfactorily as a negative electrode with a spray deposited porous nickel electrode impregnated with or pasted with nickelous hydroxide works satisfactorily as a positive electrode for a storage battery.

The impregnation may be accomplished by vacuum and pressure alternately while electroforming simultaneously while the electrodes individually or after being united in stacks with separators are immersed in suitable forming electrolyte.

A unitary electrode and separator assembly is produced according to my invention which will withstand rugged physical conditions.

I have found that it is preferable to use pure self-supporting porous particulate metal strip and that supporting grids are unnecessary to make suitable electrodes when spray depositing in continuous strip form is utilized to make these electrodes.

It is desirable to keep the porous electrodes and the active material associated therewith of uniform thickness and area as well as the separators enclosing same so that if pressures are applied to the assembly in placing same in a container or thereafter will be uniformly distributed and thereby the active materials will be in uniform conductive relationship with the porous metal electrode which is essential to uniform and good performance.

In a lead acid type battery the porous particulate lead electrodes containing active material in their interstices may be made rugged and very strong by coating with porous dielectric spray deposited enclosures.

The active lead oxides may be made into briquettes or plates and then spray coated with porous lead and then this structure spray coated with porous dielectric plastic particles to make a unitary self-supporting electrode.

In applying the dielectric particles to the electrodes according to my invention when for example polystyrene particles are used these may be in the partially polymerized condition such as are generally used for extrusion or molding purposes and after they are applied to the electrode or after they are stuck together with a plasticized exterior in strip or hollow form they are further reacted and made more strong and stable by baking at from 250° F. to 550° F. either in an open heat chamber or in a pressurized heat chamber while maintaining the base at 350° F. or less for just enough time and temperature to bond strongly but not to melt completely.

One further example regarding the use of polythene in practicing the invention is to provide such material in finely divided particles. Such particles of material are placed in a container and agitated, as with an air blast, plus a stirring device if desired, and are picked up by an air syphon. These picked-up particles are sprayed through a flame made up of a mixture of a combustile gas like propane or ordinary coal gas having oxygen mixed therewith, or with air alone, to obtain a temperature of from about 500° F. to 1500° F. and to provide an air blast for conveying the powdered material to the flame. The actual spray gun would be held about 10 to 20 inches from the base on which it is desired to deposit the material and the base normally is a shiny surface to which the sprayed material will not adhere readily and it is preferably cooled as by some fluid coolant such as air or water and the material stripped from such base after a layer of deposited material is formed. The powdered material is thus sprayed through the flame and the spray field on repeated passes of the spray gun over the base is overlapped to secure a uniform deposit on the base, which preferably is constantly moving. A very highly polished aluminum oxide surface may be provided on this base. The base extracts heat from the particles when they collide with or deposit on the base and so aids in solidifying the particles before they completely coalesce.

Also if preferred the dielectric plastic particles may be made more spherical in shape if they are dropped through a heated zone for a considerable distance in spray depositing when molten. This gives greater porosity because of the exterior great surface of the spheres.

I have also found that spherical metal particles are more preferable in making battery electrodes and their spheroidal shape is best retained by dropping them through a considerable distance under heat sufficient to fuse the outside of the particles at low velocity so that upon and after deposition on a chilled base surface they retain their spheroidal shape and are welded together at adjacent points on their surfaces.

This procedure also gives greater porosity to the dielectric particle layer or body or coating.

It is also contemplated according to this invention to use laminated layers of porous dielectric material over and around the electrodes and of different size particles if desired.

When making laminated coatings for electrodes it is preferable to use for example glass fabric adjacent the metal electrode or asbestos paper in thin layer form and thereover apply the particulate dielectric enclosure.

Also a layer of fine dielectric particulate material may be first applied to the metal electrode and a coarser layer thereover to advantage.

Serrations and hollow grooves may be incorporated into the exterior of the porous dielectric coating to facilitate gassing between each electrode if desired.

Referring to the drawings which accompany and are a part of the specifications of this patent application:

1, Fig. 1, is a section of a metal electrode having active material associated in conductive relationship with the metal thereof and having a terminal tab 2, Fig. 1, extending therefrom. 3, Fig. 1, is a sectional view of the porous particulate dielectric coating of the electrode 1, Fig. 1, partially extending about the terminal 2, Fig. 1.

Fig. 2 is a section of the electrode shown in Fig. 1 taken on the line A—A Fig. 1 wherein like numerals indicate like parts.

Thus 1, Fig. 2, illustrates a section of a porous electrode as of lead, zinc, nickel, iron or other battery metals spray deposited or sintered preferably and having active material associated therewith and 2, Fig. 2, is the terminal section thereof and 3, Fig. 2 is a section of the porous particulate dielectric support and spacer thereover.

In Fig. 3 an assembly of electrodes coated with porous dielectric particulate coatings is shown in face-to-face relation or slightly spaced if preferred over at least a part of the area of the exterior particulate coating of each electrode.

The electrodes shown in Fig. 3 are each coated with porous dielectric layer over all their active bodies and are preferably cemented or cured together so as to become a unitary structure.

In Fig. 3 the porous dielectric coatings 3, Fig. 3, are shown adjacent each other but it may sometimes be preferable to insert additional spacers (not shown) between each electrode coated with porous dielectric preferably of like material to the porous dielectric electrode enclosures 3, Fig. 3, to give additional electrode spacing.

Such additional spacers may be cemented to the spacers 3, Fig. 3, and between same and may be vertical rods or tubes closely aligned or sheets of porous dielectric material or fibrous material.

Fig. 4 of the drawings illustrates a section through a modification of the electrode of the invention and wherein a porous metal sheet 1a encloses a briquet 4 made from active lead oxide. A terminal 2a is in suitable contact with the metal sheet 1a and the briquet 4 and the entire active portion of the electrode is enclosed by a dielectric particulate layer 3a.

Fig. 5 is a section of a further electrode of the invention wherein a porous particulate metal layer 1b is shown and it has active material associated therewith whereas a terminal 2b is also suitably secured thereto. This metal layer 1b is enclosed or surrounded by a layer of, for example, glass fabric 5 that is positioned immediately adjacent the porous metal electrode while a layer 3b of particulate dielectric material is positioned over this glass fabric 5.

Fig. 6 shows a porous metal electrode 1c which has a terminal 2c secured thereto and a layer of fine dielectric particles is positioned thereover, which layer is indicated by the numeral 3c. A layer 6 of coarser dielectric particles is superimposed on the layer 3c.

Fig. 7 shows another electrode assembly of the invention in section and porous electrodes, having active material in the interstices thereof, are indicated by the numeral 1d. Suitable electrode terminals 2d are attached to the porous electrodes and a layer 3d of dielectric particulate material is positioned over at least one face of each of the electrodes. Additional porous spacers 7 are interposed between the outside of the layers 3d of the adjacent surfaces of the different electrodes. The porous spacer layers 7 may consist of rods, or particulate layers and preferably are porous.

Other thermosetting or thermoplastic coating materials may be used to achieve the purposes of my invention such as for example B-stage phenol formaldehyde resin spray deposited in molten particles and then heated to cure in a gas or liquid pressure vessel.

The particles must be so close to each other in layer form or in a mold that they will unite on exterior heating only and quickly prior to becoming entirely molten in order to retain the interstices between the particles in the layer of shape.

Having described my invention what I claim is:

1. In combination, an electrolytic cell electrode carrying active material, and a dielectric support and spacer layer of plastic material integrally bonded to and extending in substantially continuous relation over a portion of said electrode sufficient to substantially support and envelop the same, said layer comprising spray deposited particles of said plastic material welded together at adjacent points on the surface of the particles with interstices between the particles rendering the layer porous and electrolytically permeable.

2. The combination of an electrolytic cell electrode and an integrally bonded dielectric support and spacer layer as defined in claim 1 in which said layer is formed by spray deposited particles of material from the group consisting of polythene, polystyrene and phenol formaldehyde resins.

3. In combination, an electrolytic cell electrode, and a dielectric support and spacer layer of plastic material integrally bonded to and extending in substantially continuous relation over a portion of said electrode sufficient to substantially support and envelop the same, said layer comprising spray deposited particles of said plastic material welded together at adjacent points on the surface of the particles with interstices between the particles rendering the layer porous and electrolytically permeable.

4. The combination of an electrolytic cell electrode and an integrally bonded dielectric support and spacer layer as defined in claim 3 in which said layer is formed by spray deposited particles of a synthetic resin material which is non-reactive with the electrolyte.

JOSEPH B. BRENNAN.

References Cited in the file of this patent

UNITED STATES PATENTS

| Number | Name | Date |
|---|---|---|
| 696,209 | Sperry | Mar. 25, 1902 |
| 756,176 | Meygret | Mar. 29, 1904 |
| 1,128,232 | Davis | Feb. 9, 1915 |
| 1,132,183 | Hidden | Mar. 16, 1915 |
| 2,010,498 | Smith | Aug. 6, 1935 |
| 2,100,029 | Gammeter | Nov. 23, 1937 |
| 2,142,668 | Bucy | Jan. 3, 1939 |
| 2,176,427 | Kershaw | Oct. 17, 1939 |
| 2,184,373 | Adams | Dec. 26, 1939 |
| 2,247,091 | Jumau | June 24, 1941 |
| 2,297,248 | Rudolph | Sept. 29, 1942 |
| 2,371,868 | Berg et al. | Mar. 20, 1945 |
| 2,400,091 | Alfthan | May 14, 1946 |
| 2,410,225 | Macht | Oct. 29, 1946 |
| 2,465,493 | Strickhouser et al. | Mar. 29, 1949 |